(12) United States Patent
VanWingerden

(10) Patent No.: US 7,946,078 B1
(45) Date of Patent: May 24, 2011

(54) STARTER TRAY AND PLANTING AND METHOD USING A TRAY

(76) Inventor: Alan VanWingerden, Pompton Plains, NJ (US)

( * ) Notice: Subject to any disclaimer, the term of this patent is extended or adjusted under 35 U.S.C. 154(b) by 166 days.

(21) Appl. No.: 11/688,069

(22) Filed: Mar. 19, 2007

(51) Int. Cl.
*A01G 23/02* (2006.01)

(52) U.S. Cl. ............ 47/73; 47/66.7; 47/75; 47/77

(58) Field of Classification Search ........... 47/65.5, 47/66.1, 66.5, 66.7, 73–78
See application file for complete search history.

(56) References Cited

U.S. PATENT DOCUMENTS

| | | | |
|---|---|---|---|
| 901,661 A | 10/1908 | Tommins | |
| 944,522 A * | 12/1909 | Taylor et al. | 47/73 |
| 1,115,089 A * | 10/1914 | Mosler | 47/73 |
| 1,743,987 A | 1/1930 | Tinaglia | |
| 2,058,934 A * | 10/1936 | Yohe | 47/79 |
| 3,195,272 A | 7/1965 | Mosher et al. | |
| 3,846,936 A * | 11/1974 | Kelley | 47/73 |
| 3,849,932 A * | 11/1974 | Adams | 47/73 |
| 3,889,416 A * | 6/1975 | Bergeron et al. | 47/86 |
| 4,059,921 A | 11/1977 | Moriwaki | |
| 4,237,653 A * | 12/1980 | Cortez | 47/73 |
| 4,250,663 A * | 2/1981 | Merritt | 47/73 |
| 4,505,068 A * | 3/1985 | Kaneko | 47/59 R |
| 4,769,946 A * | 9/1988 | de Groot et al. | 47/73 |
| 4,888,914 A | 12/1989 | Reiger | |
| 4,941,282 A | 7/1990 | Milstein | |
| 5,218,783 A * | 6/1993 | Langezaal et al. | 47/64 |
| 5,222,326 A | 6/1993 | Higgins | |
| 5,311,700 A | 5/1994 | Thomas | |
| 5,346,514 A | 9/1994 | Molnar et al. | |
| 5,401,281 A * | 3/1995 | Chamoulaud | 47/58.1 R |
| 5,490,351 A | 2/1996 | Molnar et al. | |
| 5,555,674 A | 9/1996 | Molnar et al. | |
| 5,561,947 A * | 10/1996 | Greenarch et al. | 47/76 |
| 5,581,936 A | 12/1996 | Belgiorno | |
| 6,223,466 B1 | 5/2001 | Billings | |
| 6,263,616 B1 * | 7/2001 | Hummer | 47/65.9 |
| 6,536,158 B2 * | 3/2003 | Rice | 47/32.4 |
| D487,035 S | 2/2004 | Bellavies | |
| 7,171,782 B2 * | 2/2007 | Felknor et al. | 47/73 |
| 2008/0222950 A1* | 9/2008 | Rooker et al. | 47/65.5 |

* cited by examiner

*Primary Examiner* — David J Parsley
(74) *Attorney, Agent, or Firm* — Thomas L. Adams

(57) ABSTRACT

A plurality of plants of at least one species are planted in starter soil contained in a starter tray. The tray can have a perforated floor with a plurality of reinforcing ribs and one or more walls rising from the floor peripherally. The plants are nurtured in the starter tray long enough to develop entangled roots with an interplant root entanglement that at least partially consolidates the starter soil.

17 Claims, 5 Drawing Sheets

FIG. 8

STARTER TRAY AND PLANTING AND METHOD USING A TRAY

BACKGROUND OF THE INVENTION

1. Field of the Invention

The present invention relates to horticultural products, methods and accessories.

2. Description of Related Art

A variety of flowering and non-flowering plants may be purchased at a nursery for transplanting at various locations. These plants are typically grown in individual containers and sold as the plants are about to bloom.

Some communities have a beautification program where plants are transplanted into containers permanently located throughout the community. It is necessary to have a professional with considerable skill and experience to transplant individual plants in order to create aesthetically pleasing arrangements. Of course, sending a skilled professional to the transplant site adds greatly to the field cost. This cost can become prohibitive for ordinary homeowners that want to create attractive plantings forming arrangements in gardens or plant containers around their property.

In addition, since the plants are each grown in their own individual containers, the transplanting operation takes a significant amount of time. Typical displays are formed of numerous plants with individual holes being dug for each plant. An individual plant is then removed from a flat and placed in the associated hole. Soil is then placed in the hole to fill in the area between the plug of roots and the surrounding soil. This process is repeated for each plant, which in some cases, may require the transplanting operation to be repeated tens or hundreds of times depending on the desired size of the display.

When the plants need to be replaced, either because they are no longer in bloom or a change in season dictates replacement, each plant must be individually removed and replaced. This also requires a significant amount of time and labor by a skilled professional.

SUMMARY OF THE INVENTION

In accordance with the illustrative embodiments demonstrating features and advantages of the present invention, there is provided a method employing a starter tray. The method includes the step of placing starter soil in the starter tray. Another step is planting a plurality of plants of at least one species in the starter soil. The method also includes the step of nurturing the plants in the starter tray long enough for the plants to develop entangled roots with an interplant root entanglement that at least partially consolidates the starter soil.

In accordance with another aspect of the invention a planting is provided. The planting has a starter tray with at least one drainage hole. Also included is starter soil that is placed in the starter tray. A planting also includes a plurality of plants of at least one species grown in the starter soil long enough for the plants to develop entangled roots with interplant root entanglement that at least partially consolidates the starter soil.

In accordance with yet another aspect of the invention, a plant starter tray is provided for growing a plurality of plants. The plant started tray has a perforated floor with a plurality of reinforcing ribs. Also included is one or more walls rising from the floor peripherally to a predetermined height and enclosing a multi-plant floor space large enough to support multiple plants without barriers to impede interplant root entanglement.

Accordingly, a plant starter tray may be used to grow an aesthetically pleasing arrangement of flowering and non-flowering plants that may be easily transplanted by a person with little or no skill or experience in plant layout and design. Various shapes and sizes of plant starter trays may be used depending on the desired type of display.

In one method utilizing a circular plant starter tray, a person skilled and experienced in plant layout places starter soil and a variety seeds and cuttings in the plant starter tray to produce an aesthetically pleasing display when grown. Over time, the roots of the plants entangle in the shallow tray as they grow thereby forming a plug of entangled roots and soil. When the plants are about to bloom or are just beginning to bloom and the plug has sufficiently consolidated, the plant starter tray and its contents are put on display for sale or taken to a location for transplanting.

In one application, the plants grown in circular plant starter trays are transplanted into barrels, urns or other plant containers placed in various locations around a community as part of a beautification program. A number of plant starter trays having an aesthetically pleasing mix of flowering and non-flowering plants are loaded into racks for vehicular transport.

An ordinary laborer at the transplanting site can transplant the contents of one plant starter tray to a barrel filled with starter soil that is soaked with water. The plant and plug of entangled roots and soil is then removed from the plant starter tray and placed in the barrel. The plug may be laid directly on top of the soil in the barrel, although in some cases, the soil in the barrel may be formed into a depression to accept the plug.

An additional benefit of this scheme is that the foregoing planting can be easily replaced. When replacement is desired, either because the original planning is no longer in bloom or because a change of season dictates replacement, the plantings are easily removed by grasping them by the stems and pulling upward. The plug of entangled roots and soil typically comes out as a unit. The method of transplanting a new planting may proceed as just described.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
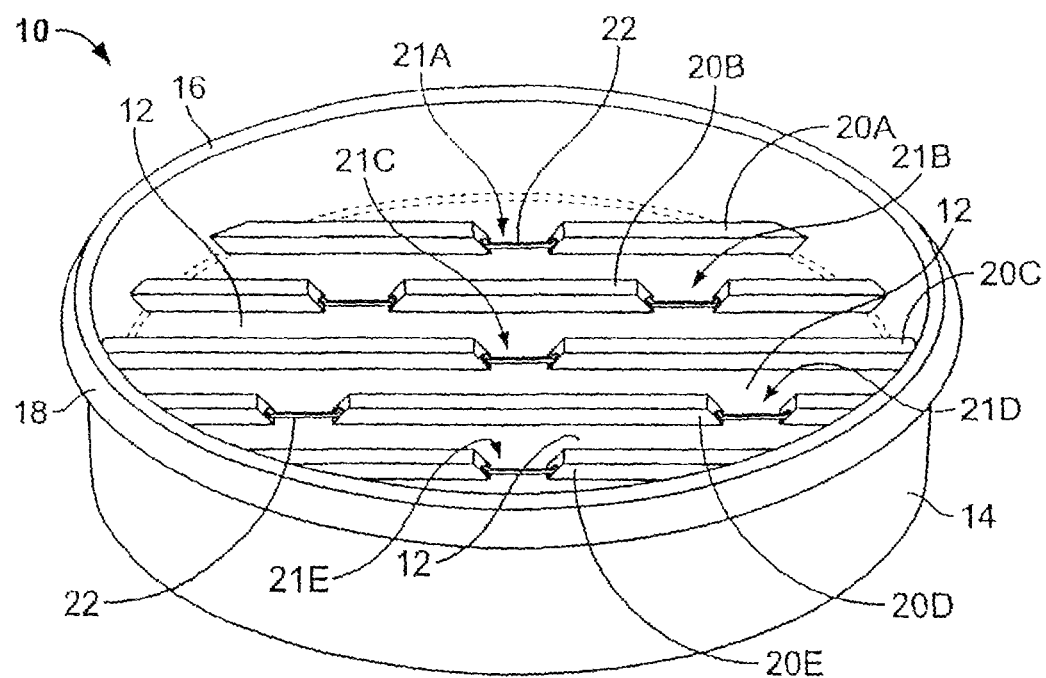
FIG. 1 is a perspective view of the starter tray in accordance with principles of the present invention.
Figure 2:
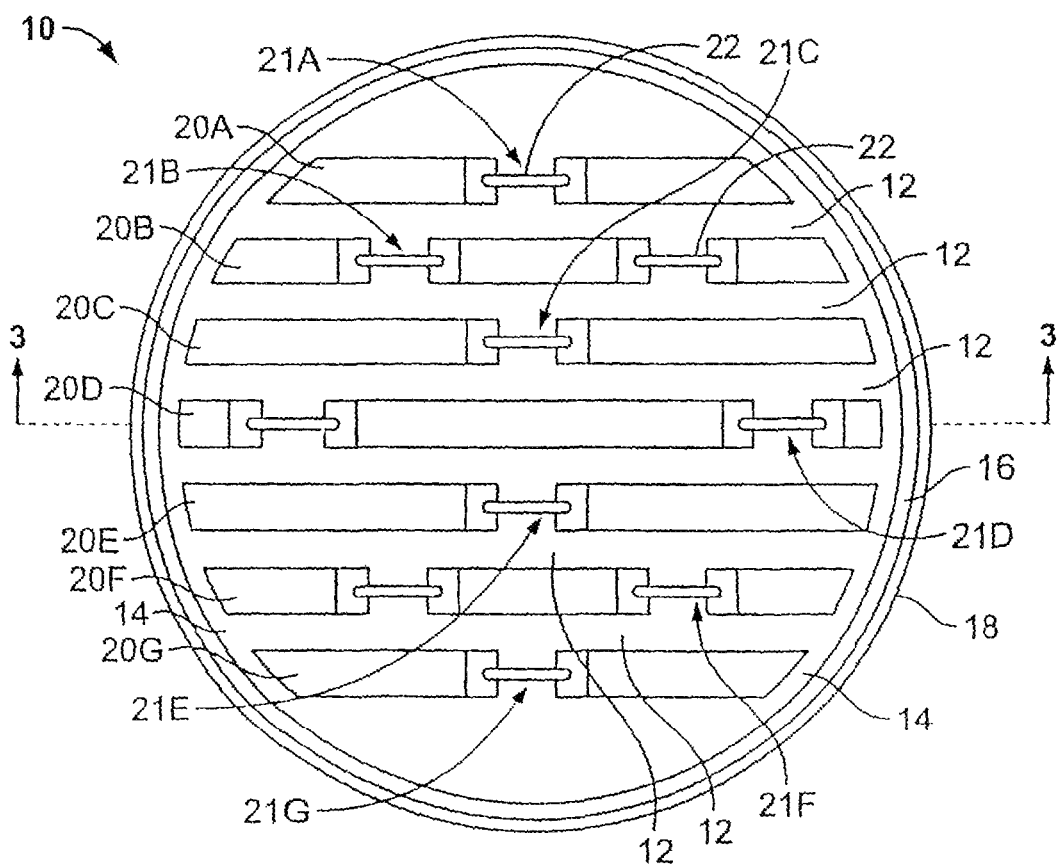
FIG. 2 is a plan view of the tray of FIG. 1.

Referring to FIGS. 1-4, a circular plant starter tray 10 has a floor 12 with a plurality of optional reinforcing ribs 20A through 20G. Each of the ribs 20A through 20G is interrupted by one or more breaches; namely, breaches 21A through 21G. Breaches 21A through 21G form valleys with banks that slope down from the top of each rib to the bottom level of the floor 12. Ribs 20A, 20C, 20E, and 20G are each formed having a single breach 21A, 21C, 21E, and 21G, respectively. Ribs 20B, 200, and 20F are each formed having a pair of breaches 21B, 21D, and 21F, respectively.

Each of the ribs 20A through 20G have an inverted U-shaped cross section presenting a relatively flat plateau above two opposing sheer faces. Ribs 20A through 20G are shell-like and have a uniform thickness approximately equal to that of the floor 12. Ribs 20A through 20G are designed to provide a desired stiffness and strength to the plant starter tray 10. Each of the ribs 20A through 20G have a uniform height for the non-interrupted lengths of each rib segment.

While ribs 20A through 20G may have an inverted U-shaped cross section giving the ribs a substantially rectangular shape, in other embodiments the ribs may have any one of numerous cross sections (for example, triangular or semicircular).

Floor 12 has numerous drainage holes 22 formed in breaches 21A through 21G. Each of the drainage holes 22 are elongated slots formed in the sections of floor 12 at the bottom of breaches 21A through 21G and extend slightly up the opposite slopes of the breaches, although holes with different shapes at different locations may be employed instead. Holes 22 in floor 12 provide a path for excess water to drain from soil that may be placed in the tray 10 while retaining that soil in the tray.

Annular wall 14 extends upward to a predetermined height from the perimeter of floor 12 substantially perpendicularly, but with a rounded corner and a small draft. The top of the wall panel 14 is rolled to form a flat ledge 16 with a dependent apron 18 extending downwardly at a small diverging angle. Ledge 16 and apron 18 stiffens and strengthens the dm of wall 14.

Plant starter tray 10 has an approximate diameter of 11 inches (28 cm) and an approximate height of 3 inches (7.6 cm) but trays are anticipated with diameters (or overall widths) in the range of 4 to 24 inches (10 to 61 cm) and heights in the range of 2 to 4 inches (5.1 to 10.2 cm). The dimensions should be chosen to produce a shallow growth tray for reasons to be described presently.

Plant starter tray 10 is made of biodegradable material such as compressed compost, pressed peat, or cardboard. Alternatively, tray 10 may be injection molded plastic forming a thin, low cost, disposable tray. In addition, tray 10 may be formed using other material, such as sheet metal, clay, etc. Tray 10 has a shell-like structure and is designed so that empty trays can be nested and stacked.

Plant starter tray 10 was previously described as circular but may have other outlines, such as outlines that are square, rectangular, polygonal, lunate, oval, elliptical, etc.

Figure 3:
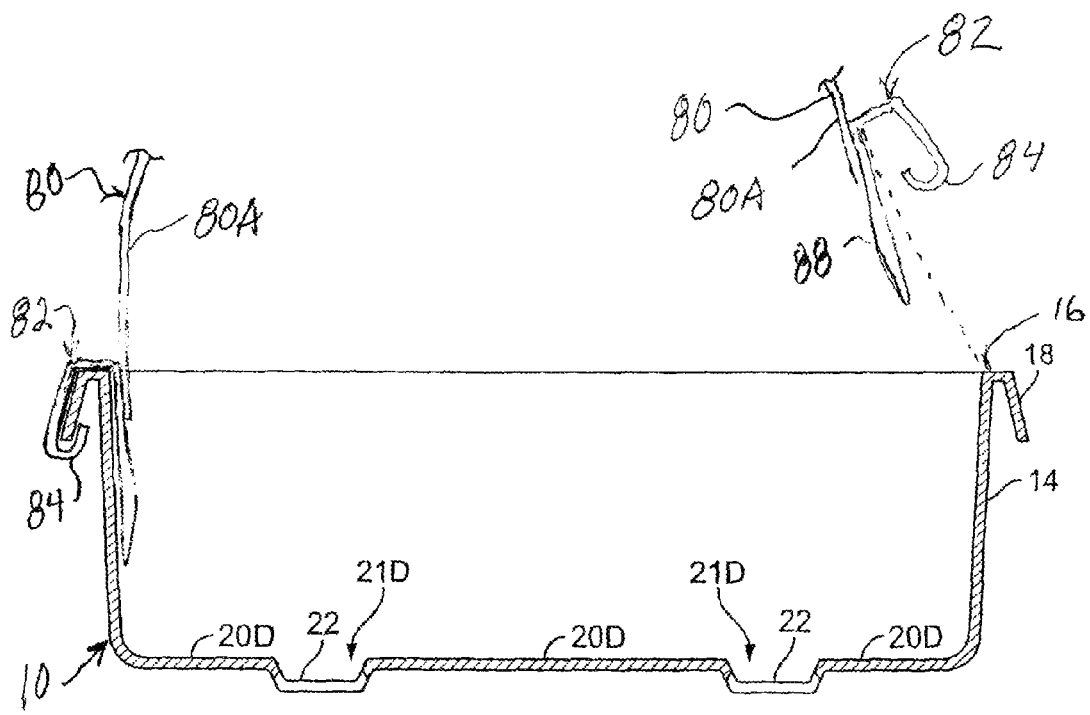
FIG. 3 is a cross-sectional view of the tray of FIG. 2 taken along line 3-3.
Figure 4:
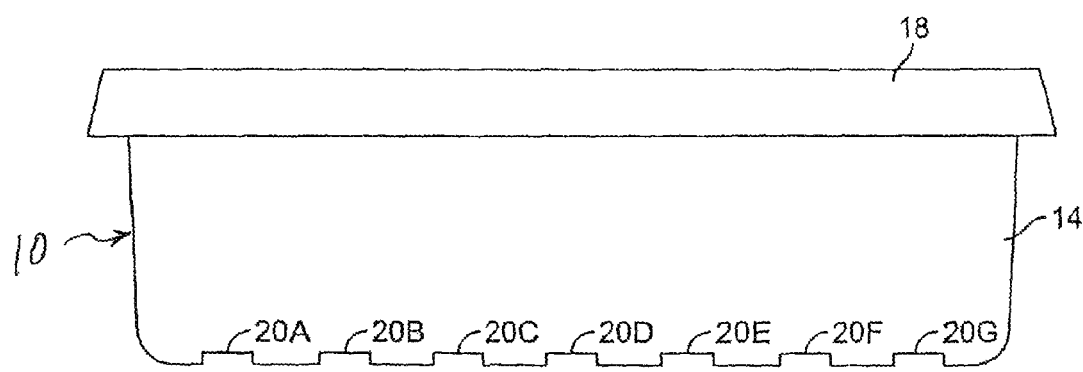
FIG. 4 is a side elevation view of the tray of FIG. 1.

FIG. 3 shows an optional carrying handle in the form of a plastic strap 80A. A clip 82 in the form of plastic strip is attached at each end of strap 80A. The outer end of clip 82 is formed into a J-shaped hook that connects through rectangular bridge 86 to a tapered blade 88. Blade 88 is built of flat plastic with a slight longitudinal crease 90 along its distal half. Crease 90 creates a valley with an oblique angle that provides additional rigidity for blade 88 when it is pressed into soil 52.

As shown in FIG. 3, blade 88 of clip 82 can be inserted flush against the inside surface of wall 14. The tapering all blade 88 facilitates soil insertion while the oblique crease 90 gives the blade additional rigidity. Hook 84 rides over apron 18, eventually hooking under the apron as shown on the left in FIG. 3. When clipped on opposite sides, handle 80 becomes a useful mechanism for carrying tray 10 when filled with a planting as described hereinafter.

Figure 5:
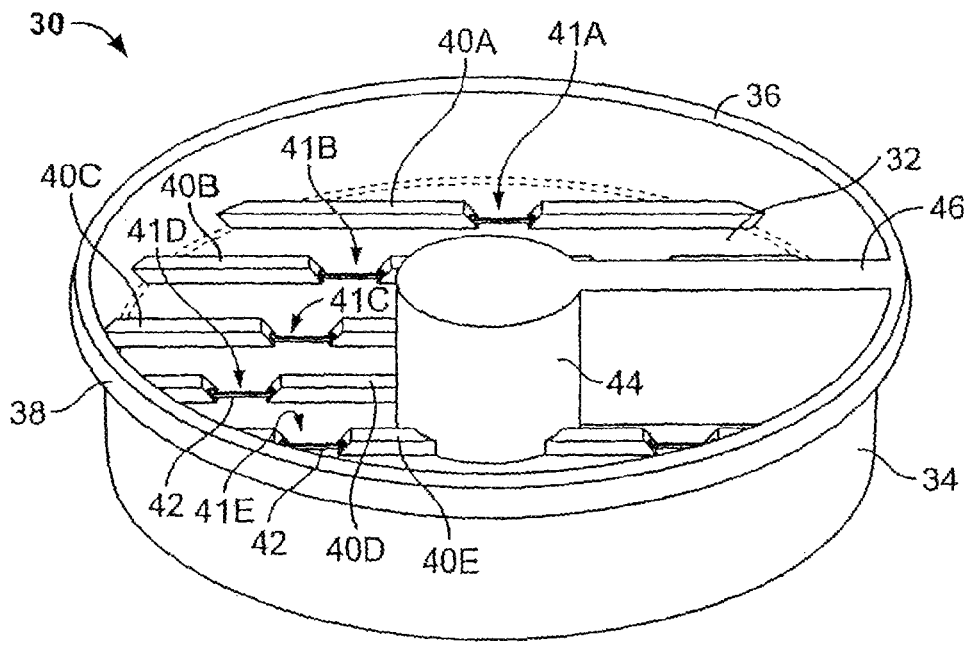
FIG. 5 is a perspective view of the tray that is an alternate to that of FIG. 1.
Figure 6:
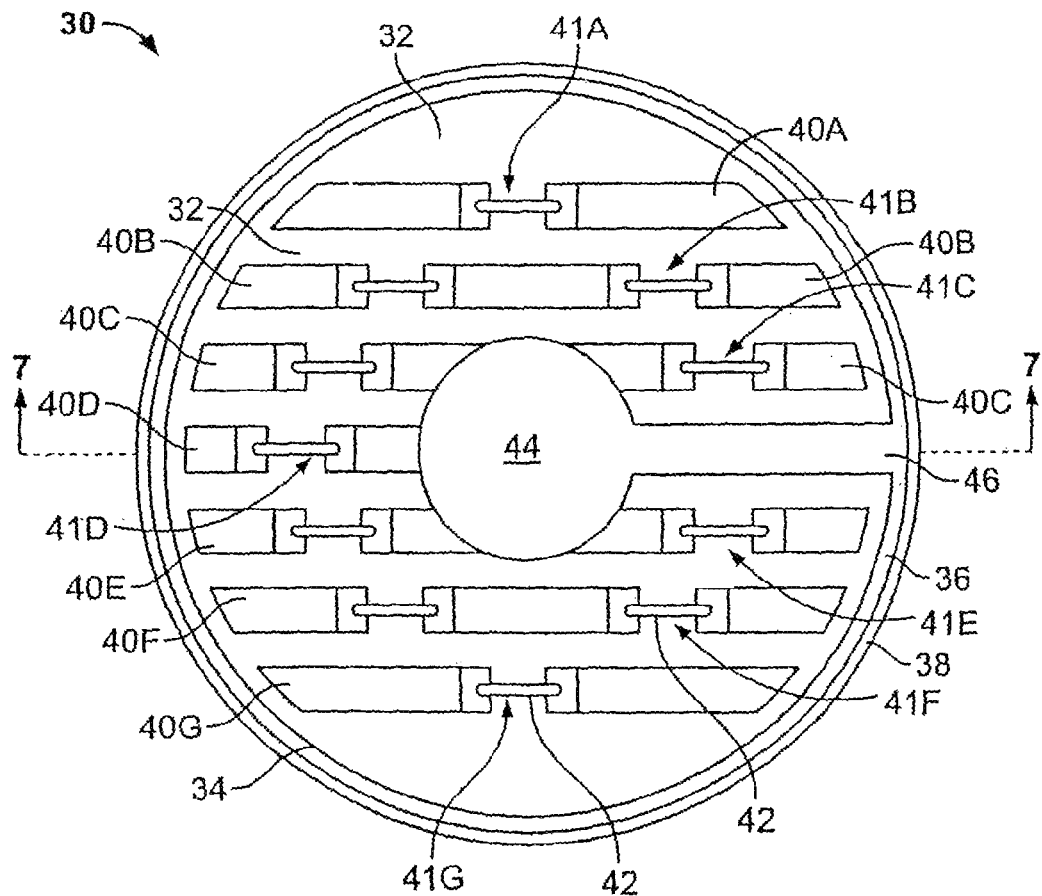
FIG. 6 is a plan view of the tray of FIG. 5.
Figure 7:
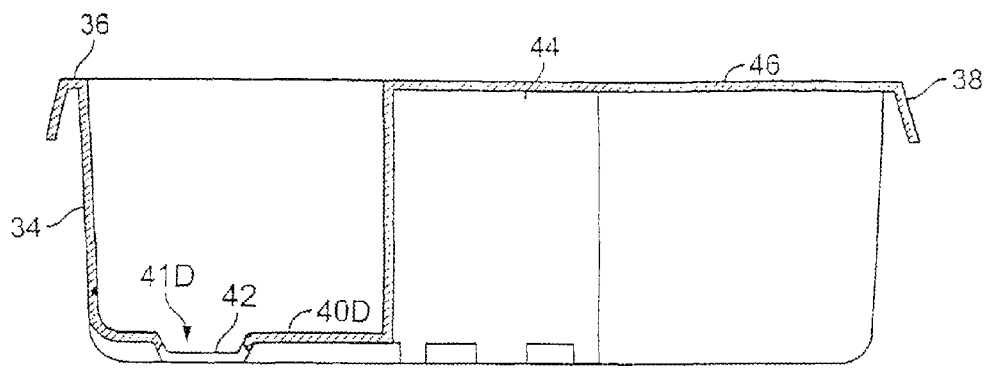
FIG. 7 is a cross-sectional view of the tray of FIG. 6 taken along line 7-7.

Referring to the alternative embodiment shown in FIGS. 5-7, a split ring plant starter tray 30 is shown as a shell-like structure having a circular outline. Rising from circular floor 32 are a plurality of optional stiffening ribs 40A through 40G, wall 46, and a central boss 44 in the form of a concentric hollow cylinder. Wall 46 is a hollow double walled divider with an inverted U-shaped cross-section.

Each of the ribs 40A through 40G is composed of numerous segments interrupted by breaches 41A through 41G. Ribs 40A, 40D, and 400 are each formed having two segments. Ribs 40B and 40F are each formed having three segments. Ribs 40C and 40E are each formed having four segments with segmenting caused by breaches 41C, breaches 41E, and the interruption caused by cylinder 44. Each of the ribs 40A through 400 have an inverted U-shaped cross section with a uniform height for the non-interrupted lengths of each rib segment. Ribs 40A through 40G have a thickness approximately equal to the thickness of floor 32.

Breaches 41A through 410 have beveled banks that slope down from the top of each rib segment to the bottom level of floor 32.

Floor 32 has numerous drainage holes 42 formed at breaches 41A through 41G. Each of the drainage holes 42 are elongated slots formed in the sections of floor 32 at the bottom of breaches 41A through 41G and extend slightly up the sloped banks of the breach.

Floor 32, wall panel 34, ledge 36, apron 38, concentric hollow cylinder 44, and dividing wall 46 are formed as one integral shell in the following manner: Annular wall 34 extends upward from the perimeter of floor 32 from a rounded corner with a slight draft. The top of the wall 34 is rolled to form a ledge 36. The outer perimeter of ledge 36 merges into a apron 38, that extends downward with a slight draft.

Concentric hollow cylinder 44 extends vertically from floor 32 to a height approximately equal to that of ledge 36 and dividing wall 46. Dividing wall 46 has an inverted U-shaped cross section and extends radially from concentric hollow cylinder 44 to wall 34, which thereby encloses a split annular cavity. Concentric hollow cylinder 44 and dividing wall 46 have a thickness approximately equal to the that of floor 32.

The diameter and height of split ring plant starter tray 30 as shown in FIGS. 5-7 are similar to those described for plant starter tray 10. In addition, the method and materials for constructing split ring plant starter tray 30 are similar as well. The concentric hollow cylinder 44 as shown in FIGS. 5-7 has an approximate diameter of 3 inches (7.6 cm) but may be dimensioned differently in other embodiments depending upon the intended use, such use being described hereinafter.

To facilitate an understanding of the principles associated with the foregoing apparatus, its operation will be briefly described in connection with the embodiment of FIGS. 1-4 and 8. A worker at a nursery experienced in plant layout fills plant starter tray with a starter soil such as peat or vermiculite. A fertilizer may be added into the starter soil in some cases.

A mix of seeds (not shown) and/or cuttings (not shown) are selected and then placed in the soil 52 so that they will eventually grow and produce an aesthetically pleasing arrangement. It will be appreciated that for FIG. 8, soil 52 was originally in tray 10 but was just removed in preparation for transplanting.

For this example, a mix of cuttings and seeds are placed in soil 52 (while still in tray 10) in order to eventually mature into blossoming plants and non-blossoming plants. The seeds and cuttings are planted with an interplant spacing that will cause interplant root entanglement before all of the plants can fully mature and before the plants fully blossom. The proper interplant spacing depends on numerous factors such as plant species and soil depth.

For embodiments where handle 80 of FIG. 3 is employed, that handle may be now be clipped into place (although handle attachment can be deferred until the time to transport arrives).

The contents of plant starter tray 10 is then watered until soil 52 is saturated. Breaches 21A through 21G allow the water to travel across ribs 20A-20G to different areas of plant starter tray 10. Excess water will drain from plant starter tray 10 through drainage holes 22.

Plant starter tray 10 is then nurtured by regular and appropriate watering, exposure to sunlight, etc. The length of time required for the seeds and/or cuttings to grow depends on several factors including the species of the plant, the ambient temperature, presence of fertilizer, and other environmental factors at the chosen location (which may be, for example, a greenhouse).

The cuttings and seeds placed in soil 52 may be arranged so that they will grow into a tall non-flowering plant 56 (for example, a grass) surrounded by a low ring of blossoming and non-blossoming plants 58 thereby producing an aesthetically pleasing display. Another example is to plant a variety of seeds that will produce numerous flowers with colors that complement each other. Yet another example is to plant several varieties of plants with the same watering and sunlight requirements to help ensure that the plants thrive, when treated consistently. Yet another example is to first plant one species of plant in the center of the tray surrounded by a group of plants of a different species than the first plant. The seeds or cuttings placed in the plant starter tray 10 typically consist of two to four different plant species but alternatively a single plant species or more than four plant species may be placed in plant starter tray 10. Any variety of plant may be grown in the plant starter tray 10.

Figure 8:
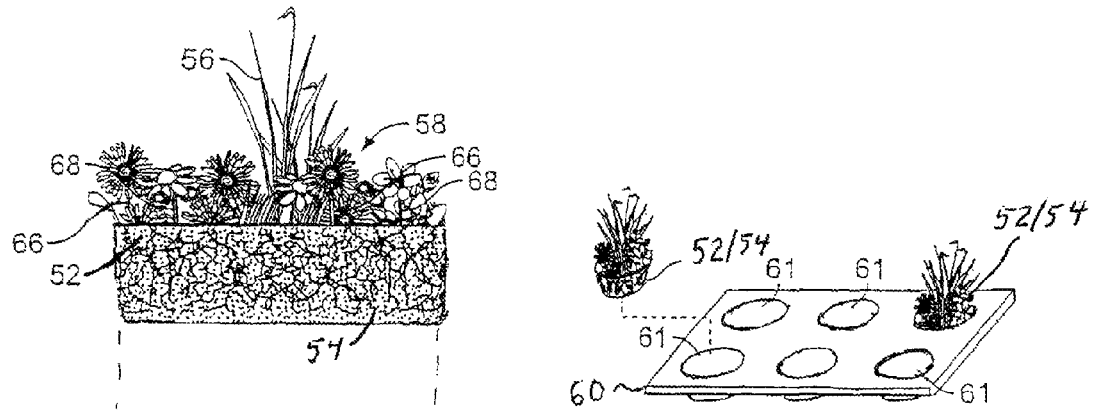
FIG. 8 is a cross-sectional view of the tray of FIG. 1 just after a plug comprising soil and entangled roots has been removed is about to be transplanted into a plant container.

Referring to FIG. 8, after a given amount of time, the seeds and or cuttings begin to grow (in tray 10), producing non-blossoming plants 56 and blossoming plants 58. The roots 54 grow into soil 52 and eventually reach floor 12 and wall 14 of plant starter tray 10.

The portion of the non-blossoming plants 56 and blossoming plants 58 growing above the surface of the soil 52 grow into the intended, aesthetically pleasing arrangement.

A shallow plant starter tray 10 having a predetermined height encloses a multi-plant floor space large enough to support multiple plants without barriers to impede interplant root entanglement. This tray 10 provides multiple benefits. First, a shallow growth tray limited to a predetermined height and correlatively limited soil depth confines the roots 54 of multiple plants and causes the roots to rapidly entangle with each other. When the roots 54 entangle they produce interplant root entanglement that eventually consolidates soil 52 at least partially.

In addition to the formation of consolidated plug 54/52, the shallow plant starter tray 10 and correlatively shallow soil depth creates biological pressure so that when plug 54/52 is transplanted the roots 54 will quickly grow beyond the original planting medium, soil 54, and into soil of the transplant site. In addition, excessive moisture can damage the roots of plants. A shallow tray allows saturated soil to drain thereby minimizing the chance of moisture damage or rot. In addition, a cycling of wet and dry soil is healthy for the plants. Moreover, shallow starting trays are easy to stack on racks for transportation of plants.

After the non-blossoming plants 56 and blossoming plants 58 have grown a substantial amount they are periodically checked to determine if a consolidated plug 54/52 has formed in plant starter tray 10. This may be done by inserting a small shovel (not shown) between soil 52 and wall 14 and then prying soil 52 slightly from plant starter tray 10. If soil 52 and roots 54 hold the form set by the plant starter tray 10 when lifted, then plug 54/52 has sufficient interplant root entanglement. It is unnecessary to consolidate plug 54/52 so thoroughly that none of the soil 52 falls away when lifted or pried. The consolidation must simply be enough to allow easy transplanting without the plug 52/54 crumbling or breaking apart.

The amount of time required for plug 54/52 to form may also be known from experience in which case plants 56 and 58 would be left in the starter trays until the proper amount of time for growth has transpired. In this case the plug 52/54 will simply be brought to a transplant site untested. In some cases a horticulturalist will determine that the plug 54/52 has consolidated sufficiently based on the maturity of the plant or the imminence of blossoming. For many applications the plant arrangement will be considered ready (and plug consolidation adequate) when the plants have an appearance indicating that the plants have reached a predetermined stage of development but have either (a) not fully matured, or (b) for blossoming plants, not fully blossomed. For many situations, the plant arrangement is most salable when it is still immature so that after transplanting it develops further and generates many new blossoms.

Several factors affect how quickly interplant root entanglement proceeds to a point where the soil 52 and roots. 54 are sufficiently consolidated that transplanting is easily accomplished without the plug 52/54 crumbling or falling apart. Decreasing the interplant spacing or decreasing the depth of soil 52 will hasten interplant root entanglement. Also, selecting fast growing (slow growing) species will hasten (retard) interplant root entanglement. The grower will typically want to achieve this consolidation through interplant root entanglement sometime before of the plants 56 and 58 have fully matured and fully blossomed. The plants 56 and 58 in tray 10 will be most salable when they are relatively young and are just beginning to blossom, so that after transplanting continued growth and blossoming will occur. For many species of plants, a soil depth of 2 to 4 inches (5 to 10 cm) with an average plant to plant spacing of 0.5 to 3 inches (1.3 to 7.6 cm) will achieve satisfactory (transplantable) consolidation of plug 52/54 at a time when plants 56 and 58 are salable as noted above (plants relatively young and just starting to blossom).

After plug 54/52 has formed and non-blossoming plants 56 are established and blossoming plants 58 are just beginning to bloom the plants are ready to be transplanted. Plant starter tray 10 and its contents may then be put on display for sale or shipped to a site for transplanting. For the present example, it will be assumed that a landscaper purchases a number of the plant starter trays 10 containing a mixture of plants 56 and 58 that are ready for transplanting.

A benefit of this method is that a specialist experienced in plant layout and the starting of plants from seeds or cuttings can operate at a nursery while the transplanting task can be assigned to someone with different skills. Since the personnel at the nursery can focus on their specialty, they will tend to grow into an aesthetically pleasing arrangement that can be transplanted by someone with little aesthetic sense. This can be especially important where the person doing the transplanting is an unskilled, ordinary homeowner.

Many communities have beautification programs in which plants are seasonally transplanted into numerous plant containers 70 (FIG. 8), such as urns or barrels. For the present example it will be assumed that a landscaper's assistant intends to plant the contents of several plant starter trays 10 in several plant containers 70 containing starter soil 72 distributed at various locations around a particular community.

After arriving at the transplant site where container 70 has been placed, plant starting tray 10 may be pushed into the starter soil 72 in container 70 and turned from to create a slight depression 72A in starter soil 72. Alternatively, a digging implement (not shown) may be used to create a shallow hole sized to receive the contents of plant starter tray 10. Another alternative is to not create a depression or hole at all but leave the surface of the starter soil as is, that is, level. If handle 80 of FIG. 3 was previously installed, both ends of that handle may now be removed by pulling hook 84 off apron 18 and discarding the handle.

Plug 54/52 is then removed from plant starter tray 10 by holding plant starter tray 10 in one hand and placing the other hand on the top of soil 52 so that stems 66,68 of plants 56 and 58 extend through the spaces between the fingers. Plant starter tray 10 and its contents are then inverted and plant starter tray 10 is lifted off plug 54/52. Plug 54/52 is then righted and laid on the surface of the starter soil 72, depression 72A or other hole that may exist in starter soil 72. Additional starter soil (not shown) may then be used to fill in edges around plug 54/52 if desired, although such fill is not strictly necessary.

The plug 52/54 and the starter soil 72 in container 70 is then watered. It is especially important to wet starter soil 72 to prevent it from wicking the moisture out of the starter soil 52 of plug 54/52.

Once transplanted, roots 54 are no longer restricted by bottom panel 12 or wall 14 of plant starter tray 10 and pent-up biological pressure cases them to grow rapidly into the starter soil 72 in container 70.

Container 70 now contains an aesthetically pleasing arrangement of flowers and plants designed by a person experienced in plant layout and transplanted by a person who may not have such skill. Accordingly, the methods previously described allow inexperienced people such as unskilled laborers or ordinary homeowners to easily transplant aesthetically pleasing arrangements of plants and flowers that are either starting to bloom or in full bloom, thereby producing coordinated displays giving great satisfaction with a minimal amount of knowledge and work.

It may be desirable to replace the plug 54/52 located in container 70 either because flowering plants 58 are no longer in bloom or a change in season dictates replacement. Then, the plug 54/52 is easily removed and replaced in the following manner: The stems 66,68 of plants 56 and 58 are grasped and pulled upward. Plug 54/52 will typically come out in one piece similar in size to when it was transplanted. After plug 54/52 is removed, a new plug with new young plants may be transplanted in its place using the previously described method.

The contents of plant starter tray 10 previously described as being transplanted into container 70, may alternatively be transplanted to a variety of other locations such as open flowerbeds or gardens using the steps just described.

To facilitate an understanding of the principles associated with the split-annulus plant starter tray 30, its operation will be briefly described in connection with the embodiment of FIGS. 5-9. The method of starting one or more species of plants in the split-ring plant starter tray 30 shown in FIGS. 5-7 and transportation to the desired location are the same as previously described for plant starter tray 10. The transplanting of the contents of split annulus plant starter tray 30 is as follows:

A variety of plants (not shown) are chosen to produce an aesthetically pleasing appearance in split annulus trays 30. The plants may be placed in an arrangement to form a ring that may be attractive when placed around the base of a small tree (not shown) or other object (not shown). For this example, it will be assumed that the plants will be placed around the base of a tree. The ground around the base of this tree may be prepared in one of the following ways: A shallow trench may be dug in the ground around the base of the tree and partially filled with starter soil if desired or necessary. Alternatively, the ground may be left as it is and a layer of starter soil may be laid out around the base of the tree. The plant plug formed of entangled roots and soil (see roots 54 and soil 52 of FIG. 8) is then removed from the split annulus tray 30 in a manner similar to that previously described for plant starter tray 10. The resulting split annulus plug can be spread somewhat at its split and looped around the base of a small tree using the transplanting method previously described. Alternatively, several split annuluses can be greatly spread at their splits and arranged end to end to encircle a larger tree trunk.

In still other embodiments, the split annulus can be straightened to form a straight strip. Later removal and replacement of the plants is accomplished as previously described.

Figure 9:
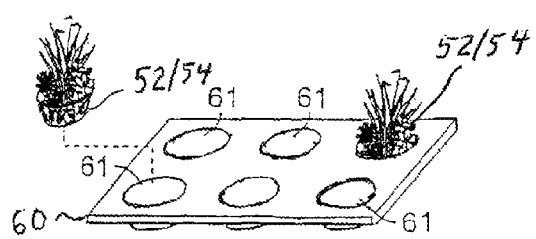
FIG. 9 is a perspective view of a tray that is an alternate to that of FIG. 1.
Figure 10:
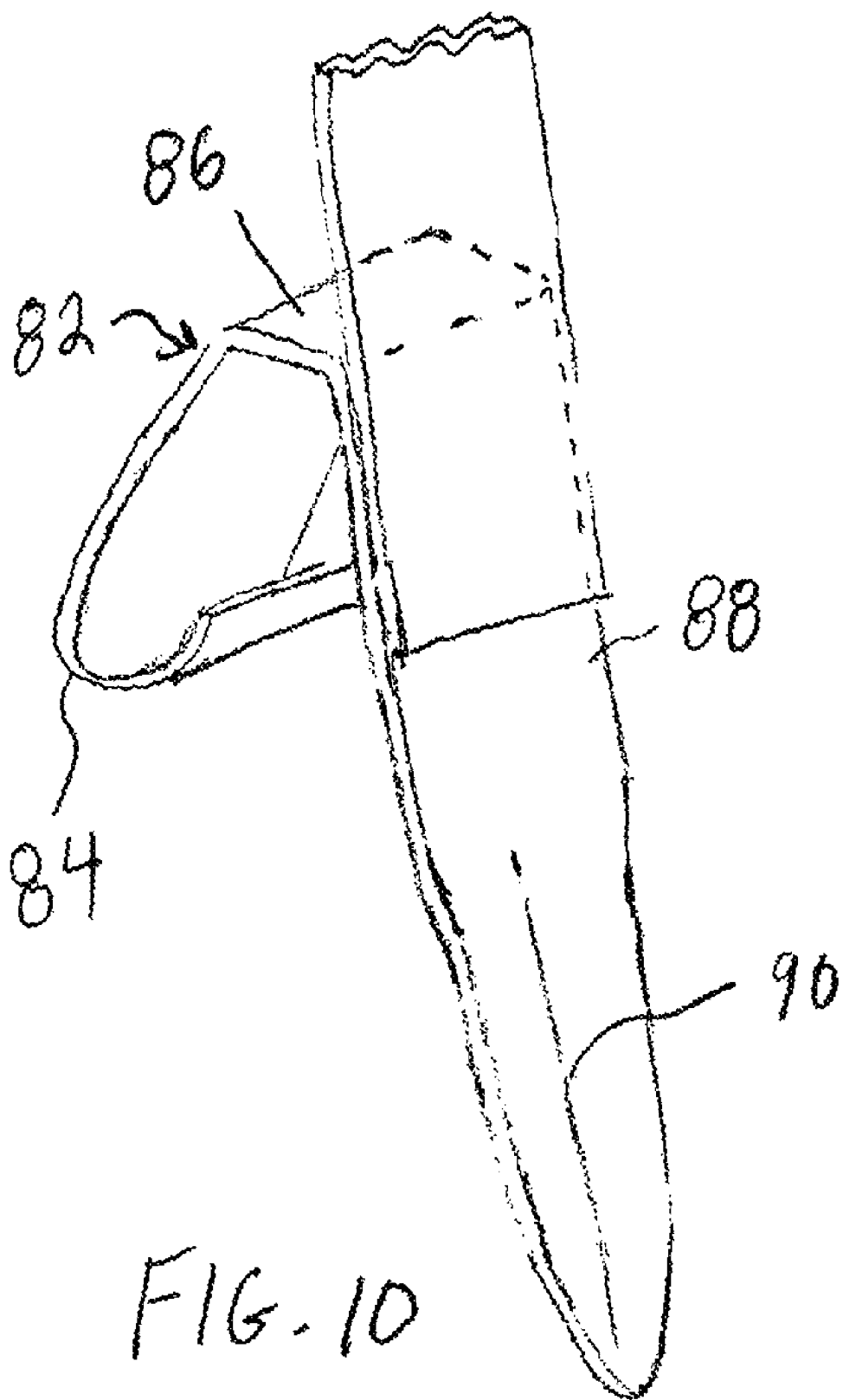
FIG. 10 is a detailed view of a portion of the handle of FIG. 3.

Referring to FIG. 9, the previously mentioned tray can be replaced with tray 60 having six recesses 61 arranged in a 3×2 matrix. The recesses 61 are sized to receive six of the previously mentioned plugs 52/54. In one embodiment each of the recesses 61 had an overall diameter of 6 inches (15.2 cm). Tray 60 is shown having six recesses 61 but may alternatively be made having more or fewer recesses. Tray 60 may be sized appropriately depending on the number and size of plant plugs 52/54 to be received.

Tray 60 may be injection molded plastic forming a thin, low cost, disposable carrying tray. Alternatively, tray 60 may be formed using any material that can be formed into the desired shape, such as sheet metal, biodegradable material, clay, etc.

Obviously, many modifications and variations of the present invention are possible in light of the above teachings. It is therefore to be understood that within the scope of the appended claims, the invention may be practiced otherwise than as specifically described.

The invention claimed is:

1. A method employing a starter tray with a floor and one or more side walls extending from said floor in an outward direction, the method comprising the steps of:
    placing starter soil in said starter tray upon said floor and encompassed by said one or more side walls;
    planting a plurality of plants of at least one species in the starter soil;
    nurturing said plants in said starter tray long enough for said plants to develop entangled roots with an interplant root entanglement that at least partially consolidates the starter soil;
    dislodging as a unit in the outward direction relative to said floor and said side walls of said starter tray said starter soil with said entangled roots, said dislodging being performed before said plurality of plants have fully matured but after said entangled roots have reached the floor of the starter tray and have consolidated the starter soil to allow dislodging by a single person without crumbling of said starter soil and said entangled roots; and transplanting said starter soil with said entangled roots by lowering as a unit down into a transplant site without the starter tray.

2. A method according to claim 1 comprising the step of:
vehicularly transporting said plants in said starter tray to said transplant site, the step of transplanting being performed at the site by personnel not employed in the step of planting the plurality of plants.

3. A method according to claim 2 wherein the step of transplanting is performed into a plant container.

4. A method according to claim 3 comprising the step of: adding soil to said plant container before the step of transplanting.

5. A method according to claim 1 wherein the step of transplanting includes the step of:
pressing the starter tray against earth at the transplant site to form a depression sized to receive the starter soil with entangled roots.

6. A method according to claim 1 wherein the step of removing said starter soil from said starter tray is performed before all of the plurality of plants have fully blossomed.

7. A method according to claim 1 wherein the step of removing said starter soil is performed before all of the plurality of plants have fully matured.

8. A method according to claim 1 wherein the step of placing starter soil is performed to make a soil depth that creates biological pressure among said plurality of plants that causes interplant root entanglement before all of the plurality of plants have fully matured.

9. A method according to claim 8 wherein interplant root entanglement develops before all of the plurality of plants have fully blossomed.

10. A method according to claim 1 wherein the step of planting the plurality of plants is performed with an interplant spacing that causes interplant root entanglement before all of the plurality of plants have fully matured.

11. A method according to claim 10 wherein the step of placing starter soil is performed to create a soil depth of between 2 to 4 inches that creates biological pressure among said plurality of plants that causes interplant root entanglement before all of the plurality of plants have fully matured.

12. A method according to claim 1 wherein the step of planting is performed with the plurality of plants comprising different species.

13. A method according to claim 12 wherein the step of planting is performed by centering a first one of said plurality of plants in said starter tray and planting around said first one a group from said plurality of plants whose species differ from said first one.

14. A method according to claim 1 employing a replacement tray, the method comprising the steps of:
placing starter soil in said replacement tray;
planting replacement plantings of at least one species in the starter soil in the replacement tray;
nurturing said replacement plantings in said replacement tray long enough for said replacement plantings to develop entangled roots with an interplant root entanglement that at least partially consolidates the starter soil;
at said transplant site replacing said starter soil having the plants with said entangled roots with said replacement plantings that have been removed from said replacement tray.

15. A method according to claim 1 wherein the step of placing starter soil is performed by laying said soil as a split annulus in said starter tray.

16. A method according to claim 15 wherein the step of transplanting is performed by spreading open said split annulus to fit around the base of an object at the transplant site.

17. A method according to claim 1 wherein the step of dislodging said starter soil with said entangled roots includes the step of:
turning said starter tray and said starter soil with said entangled roots upside down and lifting said starter tray from said starter soil with said entangled roots.

* * * * *